(12) United States Patent
Drugge et al.

(10) Patent No.: US 8,041,318 B2
(45) Date of Patent: Oct. 18, 2011

(54) RELATIVE FREQUENCY ERROR COMPENSATION FOR MULTI-CARRIER RECEIVERS

(75) Inventors: Oskar Drugge, Lund (SE); Farshid Ghasemzadeh, Sollentuna (SE); Anders Wallén, Eslöv (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 603 days.

(21) Appl. No.: 12/248,756

(22) Filed: Oct. 9, 2008

(65) Prior Publication Data
US 2009/0312056 A1  Dec. 17, 2009

Related U.S. Application Data

(60) Provisional application No. 61/073,077, filed on Jun. 17, 2008, provisional application No. 61/076,305, filed on Jun. 27, 2008.

(51) Int. Cl.
*H04B 17/02* (2006.01)
*H04K 3/00* (2006.01)

(52) U.S. Cl. .................. 455/136; 455/192.1; 375/344

(58) Field of Classification Search .......... 455/136, 455/192.1, 192.2, 192.3, 255, 265; 375/344
See application file for complete search history.

(56) References Cited

U.S. PATENT DOCUMENTS

| 2004/0005018 A1 | 1/2004 | Zhu et al. | |
|---|---|---|---|
| 2006/0171488 A1 | 8/2006 | Rosenlof et al. | |
| 2006/0209979 A1* | 9/2006 | Sandell et al. | 375/267 |
| 2010/0098195 A1* | 4/2010 | Nekhamkin et al. | 375/344 |

FOREIGN PATENT DOCUMENTS

| WO | WO8504999 A1 | 11/1985 |
|---|---|---|
| WO | WO03043180 A1 | 5/2003 |

OTHER PUBLICATIONS

Qualcom Europe: "Text Proposal for TR on UE Implementation Impact due to DC-HSDPA" 3GPP Draft; R1-082140, 3rd Generation Partnership Project (3GPP), Mobile Competence Centre; 650, Route Des Lucioles; F-06921 Sophia-Antipolis Cedex; France, vol. RAN WG1. Kansas City, MO, USA; May 14, 2008. XP050110453.
International Search Report, application No. PCT/EP2009/055757. Date of mailing: Nov. 24, 2009. European Patent Office, Rijswijk, Netherlands.
3GPP TS 25 104. v8.3.0. "3rd Generation Partnership Project; Technical Specification Group Radio Access Network; Base Station (BS) radio transmission and reception (FDD) Release 8." May 2008. 77 pages. 3GPP™, Valbonne, France.
3GPP Work Item Description RP-080490. "Dual-Cell HSDPA operation on adjacent carriers." May 2008. 4 pages. 3GPP™, Valbonne, France.

* cited by examiner

*Primary Examiner* — Lee Nguyen
(74) *Attorney, Agent, or Firm* — Coats & Bennett, P.L.L.C.

(57) ABSTRACT

A wireless receiver utilizes a single analog oscillator to down-convert multi-carrier signals in one or more receiver front-end paths. The received signals are digitized, and the different carrier signals received at each antenna are separated in digital domain by mixing the digitized signal from each antenna with a carrier/antenna separation digital oscillator to down-convert a desired carrier signal and low-pass filtering to remove unwanted carriers. A coarse frequency correction adjusts the analog oscillator, and fine frequency corrections adjust digital oscillators mixing with the separated signals. In one embodiment, the fine frequency correction is applied to the carrier/antenna separation digital oscillators in the separation function. In another embodiment, the fine frequency correction is applied to frequency adjustment digital oscillators mixing with the separated signals. The frequency corrections may be based on reference symbols in the received signals.

13 Claims, 6 Drawing Sheets

RELATIVE FREQUENCY ERROR COMPENSATION FOR MULTI-CARRIER RECEIVERS

This application claims priority to U.S. Provisional Patent Application Ser. No. 61/073,077, filed Jun. 17, 2008, and U.S. Provisional Patent Application Ser. No. 61/076,305, filed Jun. 27, 2008, each of which is incorporated herein by reference in its entirety.

BACKGROUND

UMTS Terrestrial Radio Access (UTRA) is the radio access network for the Universal Mobile Telecommunication System (UMTS), a 3G wireless communication system. The 3GPP standards body has approved a work item for Dual Cell High-Speed Downlink Packet Access (HSDPA) operation. The dual cell HSDPA operation can improve the bit-rate in terms of peak rate and average bit rate from the end-user's perspective. In dual cell HSDPA, separate data streams are modulated onto separate carriers, and transmitted together to User Equipment (UE) in the cell. The main focus of the study is on adjacent carriers. The aggregation of data in multiple carrier operation for Long Term Evolution (LTE) is not fully developed in 3GPP; however, the problems identified and solved by the present invention should, in general, apply to any wireless standard, such as LTE and GSM.

HSDPA in legacy UMTS systems is based on single cell, or carrier, operation. The frequency error between a transmitter and receiver—caused by frequency error in the base station and Doppler shift in channel—is compensated in the UE for single carrier operation. The required base station frequency accuracy for single-carrier in 3GPP is 0.05 ppm (for macro base stations). Considering two individual carriers for dual cell HSDPA, the relative frequency error between the carriers at the base station reference points could be up to 0.1 ppm. Currently there is no 3GPP requirement on base station relative frequency error; however, it can be assumed that a base station which uses the same source for frequency generation can have lower relative frequency error than 0.1 ppm since the error in the source can be excluded from the relative frequency error.

In dual cell HSDPA operation, data is modulated onto two carriers, which can advantageously be received in a multi-carrier receiver in the UE. For dual cell HSDPA, the concept of anchor and supplementary carrier is under discussion in 3GPP. The anchor carrier is contemplated as a legacy HSDPA carrier, which carries the same physical channels as a legacy HSDPA carrier. The supplementary carrier may only be required to carry a reduced set of physical channels, in order to reduce the control signaling overhead.

A number of multi-carrier receiver architectures are possible. One solution with high bandwidth and low complexity (and hence cost) utilizes multiple antennas and corresponding receiver paths in the analog front-end. The signals are then digitized, and the antenna/carrier separation, demodulation, decoding, and the like are performed in the digital domain, such as by software executing on Digital Signal Processors (DSP). For adjacent or sufficiently close carriers, a single local oscillator can be used to down-convert both carrier signals to baseband. The local oscillator frequency can be adjusted to correct for frequency errors between the transmitter and receiver. However, only one of the dual (or more) carriers may be frequency-corrected in this manner. Alternatively, the receiver may use a separate local oscillator for each carrier, and separately control each oscillator to frequency-correct each carrier. However, this approach adds cost and complexity.

SUMMARY

According to embodiments of the present invention, a wireless receiver utilizes a single analog oscillator to down-convert multi-carrier signals received at one or more antennas, in a corresponding number of receiver front-end paths. The received signals are digitized, and the different carrier signals received at each antenna are separated in digital domain by mixing the digitized signal from each antenna with a carrier/antenna separation digital oscillator to down-convert a desired carrier signal and low-pass filtering to remove signal components outside the desired frequency range. A coarse frequency correction adjusts the analog oscillator, and fine frequency corrections adjust digital oscillators mixing with the separated signals. In one embodiment, the fine frequency correction is applied to the carrier/antenna separation digital oscillators in the separation function. In another embodiment, the fine frequency correction is applied to frequency adjustment digital oscillators mixing with the separated signals. The frequency corrections can be based on reference symbols in the received signals, or on blind frequency error estimates. An automatic frequency control function may generate, in response to reference symbols in the received signals, an error signal to alter the frequency of the local oscillator and a one or more error signals to alter the frequency of the one or more digital oscillators, the error signals operative to reduce an error in the frequency difference between the carrier frequencies.

One embodiment relates to a method of receiving wireless signals in a wireless receiver. Signals modulated onto one or more carrier frequencies are received at one or more antennas. The received signals are down-converted by mixing each with the output of a common analog oscillator. The down-converted received signals are digitized. Each of the received different carrier frequency signals is separated. A coarse frequency adjustment is performed by adjusting the output of the analog oscillator. Fine frequency adjustments are performed on each of the frequency separated signals to compensate for an error in the difference between the carrier frequencies.

The inventive receiver may be deployed in User Equipment (UE) and in base stations.

DETAILED DESCRIPTION

Figure 1:
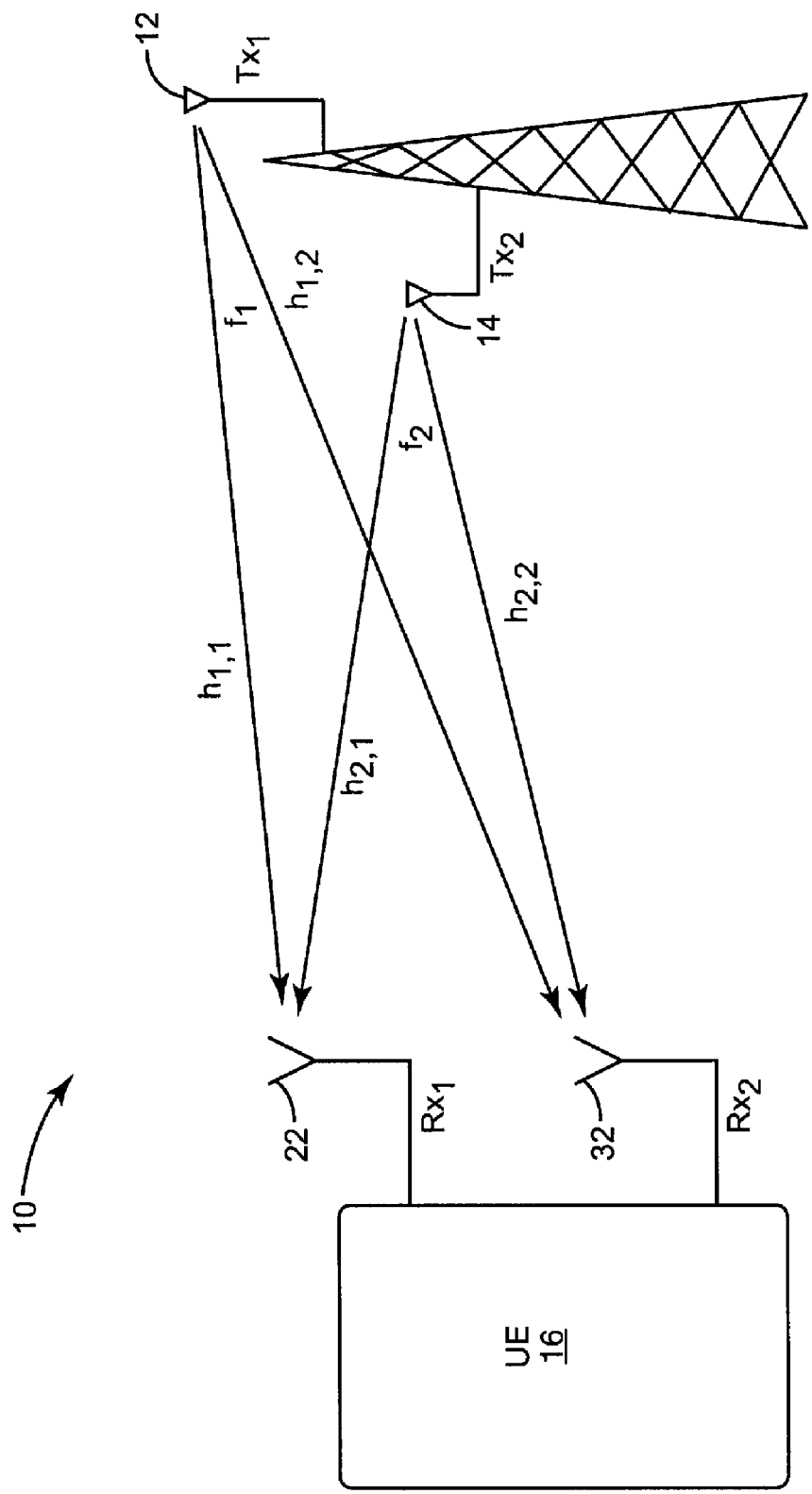
FIG. 1 is a diagram of a base station and UE in a wireless communication system.
Figure 2:
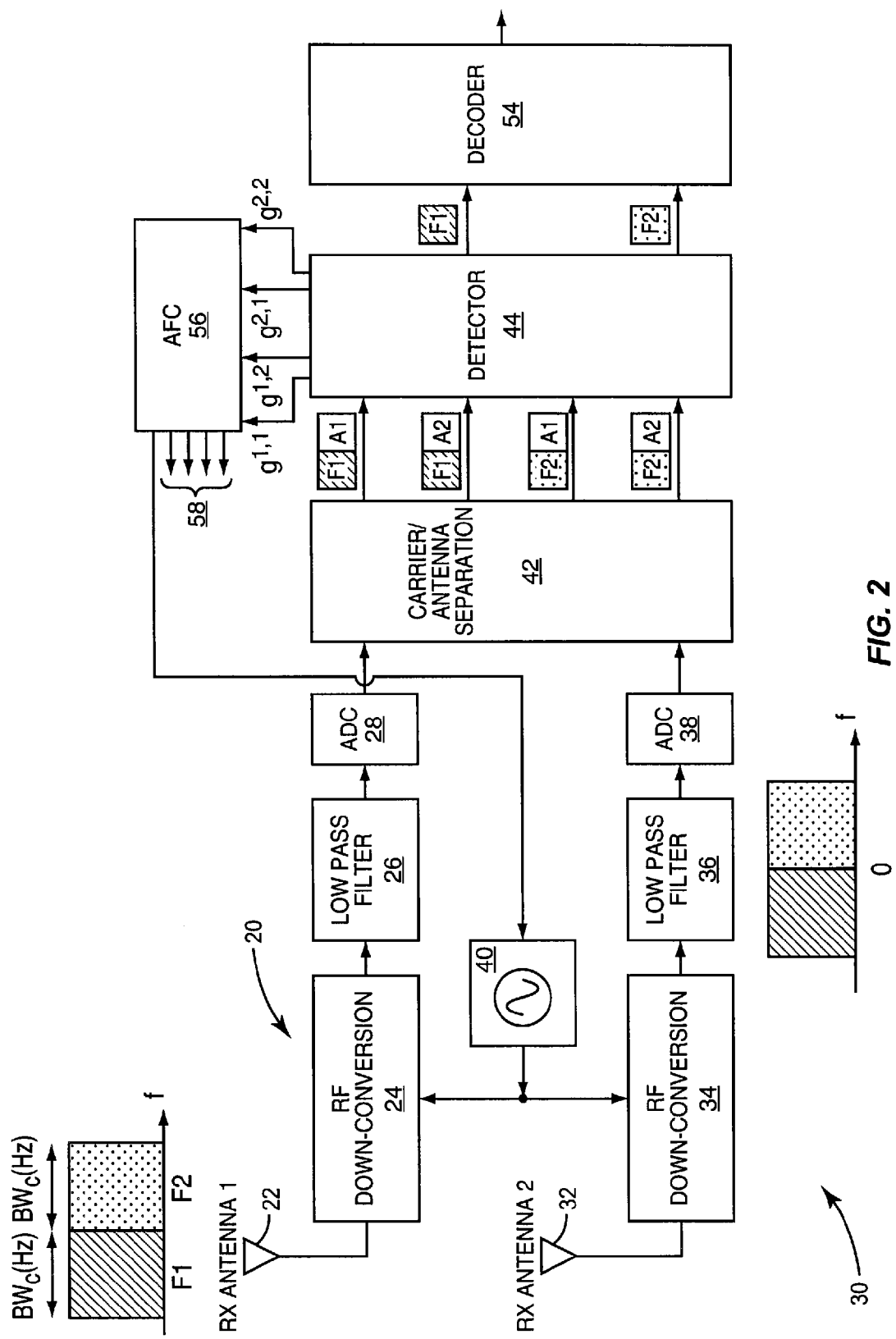
FIG. 2 is a functional block diagram of a dual-carrier receiver.

FIG. 1 depicts a wireless communication network 10 in which a transmitter transmits a signal from a first antenna 12 that is modulated on a first frequency $f_1$ and a signal from a second antenna 14 that is modulated on a second frequency $f_2$. The signals are modulated onto two adjacent carriers with individual bandwidths BWc and with no relative frequency error. Both signals are received by a User Equipment (UE) 16, at antennas 22 and 32. In general, the signal from each transmit antenna 12, 14 to each receiver antenna 22, 32, will experience different channel effects, as shown. As known in the art, each of the transmitted signals usually includes known reference, or pilot, symbols to aid the UE 16 in channel characterization and estimation of e.g. frequency error FIG. 2 depicts the relevant portion of a multi-carrier receiver within the UE 16. The receiver uses a single local oscillator 40 to down-convert signals modulated on two adjacent carriers, using two receiver paths 20, 30. Multi-carrier signals (e.g. signals modulated on one or more carrier frequencies) are received at two antennas 22, 32, and down-converted to baseband frequency at functional blocks 24 and 34, by mixing the received signals with the output of oscillator 40. In particular, the frequency of the analog oscillator 40 may be set to $(f_1+f_2)/2$ so that DC falls precisely in between the two received carrier frequencies, $f_1$ and $f_2$. The two received signals are further low-pass filtered in blocks 26 and 36 to remove interferers at frequencies outside of the ones occupied by the two desired carriers. Each received signal is then digitized at an analog to digital converter 28, 38 and passed to a Carrier/Antenna Separation function 42. The Carrier/Antenna Separation function 42 separates out the two carrier frequency signals received at each of the two antennas, generating four received signals.

Figure 3:
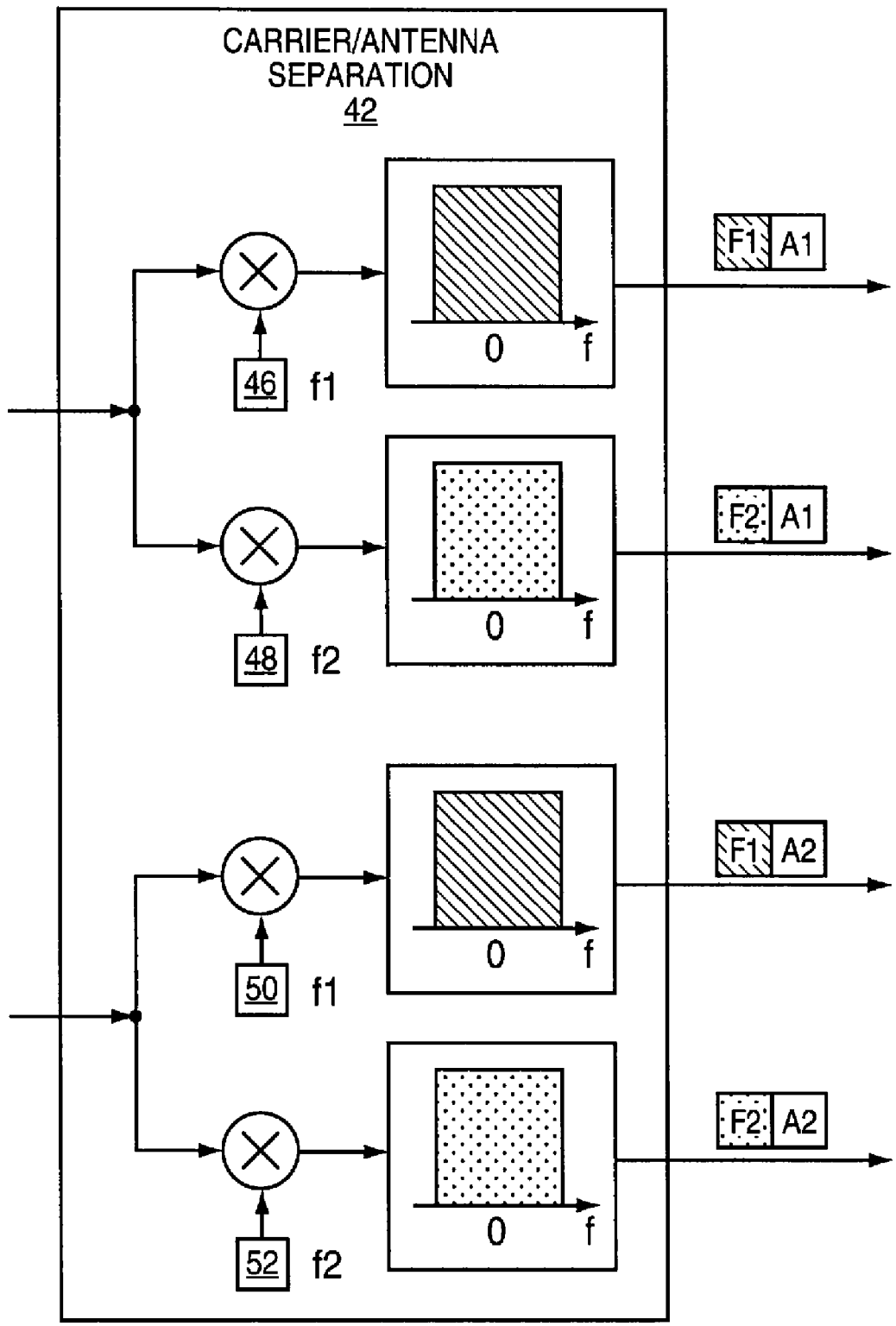
FIG. 3 is a functional block diagram of a Carrier/Antenna Separation function.

FIG. 3 depicts the Carrier/Antenna Separation function 42 in greater detail. The outputs of four complex digital oscillators 46, 48, 50, 52—referred to herein collectively as carrier/antenna separation digital oscillators—mix with the multi-carrier signals from each antenna. If the frequency of the analog oscillator 40 is set to $(f_1+f_2)/2$, and the frequencies of the carrier/antenna separation oscillators 46, 48, 50, 52 are denoted $f_{46}$, $f_{48}$, $f_{50}$, and $f_{52}$ respectively, they are set so as to down-convert the carrier of interest for the particular branch to zero frequency as follows:

$$f_{46} = f_{50} = \frac{f_1 - f_2}{2}$$

$$f_{48} = f_{52} = -\left(\frac{f_1 - f_2}{2}\right)$$

Once the carrier of interest has been down-converted to zero frequency, the adjacent unwanted carrier is removed using a subsequent low-pass filter.

As known to those skilled in the art, a straight-forward implementation of a digital oscillator is by means of a complex number $e^{j2\pi k f/f_s}$, where k is the sample number, f is the frequency of the oscillator, and $f_s$ is the sampling frequency. A signal multiplied with such a complex number with unit amplitude and the argument linearly varying in time, will be shifted in frequency, e.g., to accomplish the frequency error compensation as described herein according to embodiments of the present invention.

Referring back to FIG. 2, a detector 44 receives the four carrier/antenna separated signals, and performs the necessary operations to produce soft bits for each carrier, which are provided to the decoder 54. With regular intervals, e.g. once per slot, a set of samples are processed by the detector 44, providing a set of received and de-spread known reference symbols, $S_{ref}$, containing $N_{sref}$ symbols. $S_{ref}$ can e.g. be a set of Common Pilot Channel (CPICH) pilot symbols, $g_i^{c,a}$, where i denotes the pilot symbol number from 1 to $N_{sref}$ in the set of received reference symbols $S_{ref}$, c denotes carrier number, and a denotes receiver antenna number. The pilot symbols are received by an Automatic Frequency Control (AFC) function 56. The AFC 56 analyses the received pilot symbols and produces a control command to adjust the local oscillator 40 to reduce the frequency error between the transmitted and received frequencies. The AFC 56 additionally generates four digital oscillator error signals 58 to reduce a relative frequency error between the carriers, as discussed more fully herein. In the embodiment depicted in FIG. 2, with the digital oscillator error signals 58 unconnected, the receiver mimics prior art multi-carrier receivers.

The analysis and generation of the local oscillator 40 frequency correction control command in the AFC 56 is based on received pilot symbols and can be performed in several ways. By way of example, it may be performed as follows:

1. Channel estimates, $h_i^{c,a}$ where c denotes carrier number, a denotes receiver (Rx) antenna a and i denotes the received pilot symbol number in set of received reference symbols $S_{ref}$ being processed, are produced according to $$h_i^{c,a} = g_i^{c,a}(p_i^c)^* \tag{1}$$

where $p_i^c$ denotes the transmitted (known) pilot symbols and * denotes complex conjugate.

2. To estimate the phase difference between subsequent channel estimates, $\Delta h_i^{c,a}$ is calculated for $i=0, 1, \ldots N_{sref}-1$ according to $$\Delta h_i^{c,a} = h_{i+1}^{c,a} \cdot (h_i^{c,a})^*. \tag{2}$$

Here, $h_0^{c,a}$ can readily be taken as the last channel estimate from the previous set of reference symbols.

3. Filter the values attained in the previous step, e.g., by taking the mean as, $$y_{c,a} = \frac{1}{N_{sref}} \sum_{i=0}^{N_{sref}-1} \Delta h_i^{c,a}. \tag{3}$$

Although not explicitly stated in (3), WCDMA receivers usually employ despreaders at different time delays, so-called fingers. The number of employed fingers is usually adjusted to match the propagation channel. If more than one finger is employed, one can filter $y_{c,a}$ also over the fingers and equation (3) becomes $$y_{c,a} = \frac{1}{N_{sref} \cdot N_{f,c,a}} \sum_{F_{c,a}} \sum_{i=0}^{N_{sref}-1} \Delta h_{i,f}^{c,a}, \tag{3a}$$

where $\Delta h_{i,f}^{c,a}$ denotes values attained as in (2), but apart from having one value per carrier, receiver antenna, and pilot symbol in set of received reference symbols $S_{ref}$ containing $N_{sref}$ symbols, one also has one value per finger. $f.F_{c,a}$ denotes the set of all fingers from carrier c and receiver antenna a, and $N_{f,c,a}$ denotes the number of employed fingers for carrier c and receiver antenna a.

4. Then compute the angle, $$\varphi_{c,a} = \frac{1}{2\pi} \arctan \frac{\text{Im}(y_{c,a})}{\text{Re}(y_{c,a})}. \tag{4}$$

5. The estimated frequency error, $f_{c,a}$, for each carrier and antenna can be computed as, $$2\pi\varphi_{c,a} = 2\pi \cdot \Delta t \cdot f_{err,c,a} \Rightarrow f_{err,c,a} = \frac{1}{\Delta t} \cdot \varphi_{c,a} \text{Hz}, \tag{5}$$

where $\Delta t$ is the time between two subsequent calculations of $\phi_{c,a}$.

6. Form the control signal for the local oscillator 40, e.g. by using a linear average of the individual frequency errors, $$LO_{cntrl} = -\frac{1}{N}\sum_C \sum_A f_{err,c,a}, \tag{6}$$

where C denotes the set of all carriers, A denotes the set of all receiver antennas. If $N_a$ is the number of antennas, and $N_c$ is the number of carriers, then $$N = N_a N_c \tag{7}$$

7. Apply the $LO_{cntrl}$ signal to the local oscillator 40.

Controlling the frequency error with only the local oscillator 40 cannot fully compensate for the frequency error on both carriers $f_1$ and $f_2$. If the frequency compensation is based on the anchor carrier, the performance of supplementary carrier will suffer. Two or more local oscillators may be used to independently correct for frequency errors on each carrier. However, this approach leads to an unnecessarily complex implementation.

According to embodiments of the present invention, a two-stage frequency compensation is performed on the received signals. A course correction is applied to the multi-carrier signal, using the local oscillator 40, to correct for frequency error between the transmitted and received frequencies. Additionally, a fine correction, using digital oscillators, is applied to each received signal, after or during antenna/carrier separation, to correct for relative frequency error between the carriers.

This approach may be used as long as the dual-cell HSDPA is deployed on adjacent frequencies, or frequencies that are not adjacent but are within the same band. The principles of the present invention should also apply on LTE if data aggregation on different carriers is introduced in the 3GPP LTE standard. For the dual/multi-cell scenarios between different frequency bands, separate local oscillators for each band will probably be needed, and fine tuning using digital oscillators for each of the carriers will not be needed.

Figure 4:
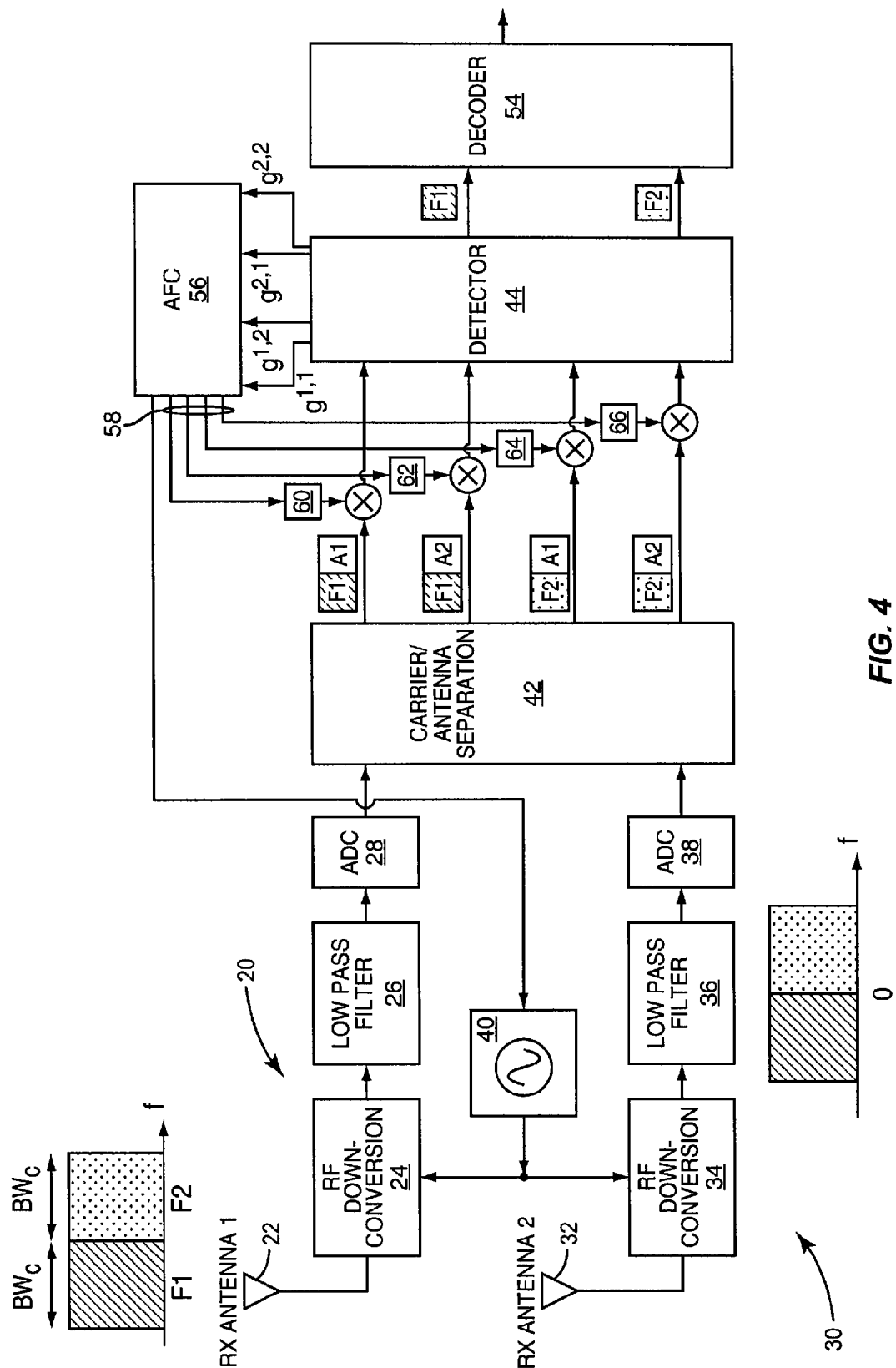
FIG. 4 is a functional block diagram of a dual-carrier receiver, according to one embodiment of the present invention.

In one embodiment of the present invention, depicted in FIG. 4, the AFC function 56 generates a frequency error correction signal for the local oscillator 40, as described above. Additionally, the digital oscillator frequency error correction signals 58 are applied to digital oscillators 60, 62, 64, and 66—referred to herein collectively as frequency adjustment digital oscillators—the output of each of which is mixed with a carrier/antenna separated signal. In this embodiment, the analog frequency correction of the local oscillator 40 can be adjusted to compensate for the frequency of either one of the carriers, or to any weighted average of the frequency error in each individual carrier. The frequency adjustment digital oscillators 60-66 can compensate for the residual frequency error on each carrier/antenna separated signal, due to a non-zero relative frequency error between the carriers.

The analysis and generation of frequency error correction signals for the embodiment depicted in FIG. 4 may be the same as the algorithm described above in steps 1-5. Steps 6-7 in that algorithm may be replaced with steps 6a-9a as follows:

6a. Form the control signal for the local oscillator 40 using a weighted linear average of the individual frequency errors, $$LO_{cntrl} = -\sum_C \sum_A w_{c,a} f_{err,c,a} \tag{8}$$

where $w_{c,a}$ denotes the weighting of each frequency error, C denotes the set of all carriers and A denotes the set of all Rx antennas.

7a. Calculate the residual frequency error on each carrier and antenna as, $$f_{err,residual,c,a} = f_{err,c,a} + LO_{cntrl} \tag{9}$$

8a. Because the frequency error is not expected to differ on the two antennas, a weighted linear average is used to derive the control signals for the digital oscillators 60-66 as follows:

$$DO_{cntrl,c} = -\sum_A k_{c,a} f_{err,residual,c,a} \tag{10}$$

where $k_{c,a}$ denotes the weighting of each frequency error and A denotes the set of all Rx antennas.

9a. Apply the $LO_{cntrl}$ signal to the local oscillator 40; apply $DO_{cntrl,1}$ to the frequency adjustment digital oscillators 60, 62 corresponding to carrier 1, and apply $DO_{cntrl,2}$ to the frequency adjustment digital oscillators 64, 66 corresponding to carrier 2.

Figure 5:
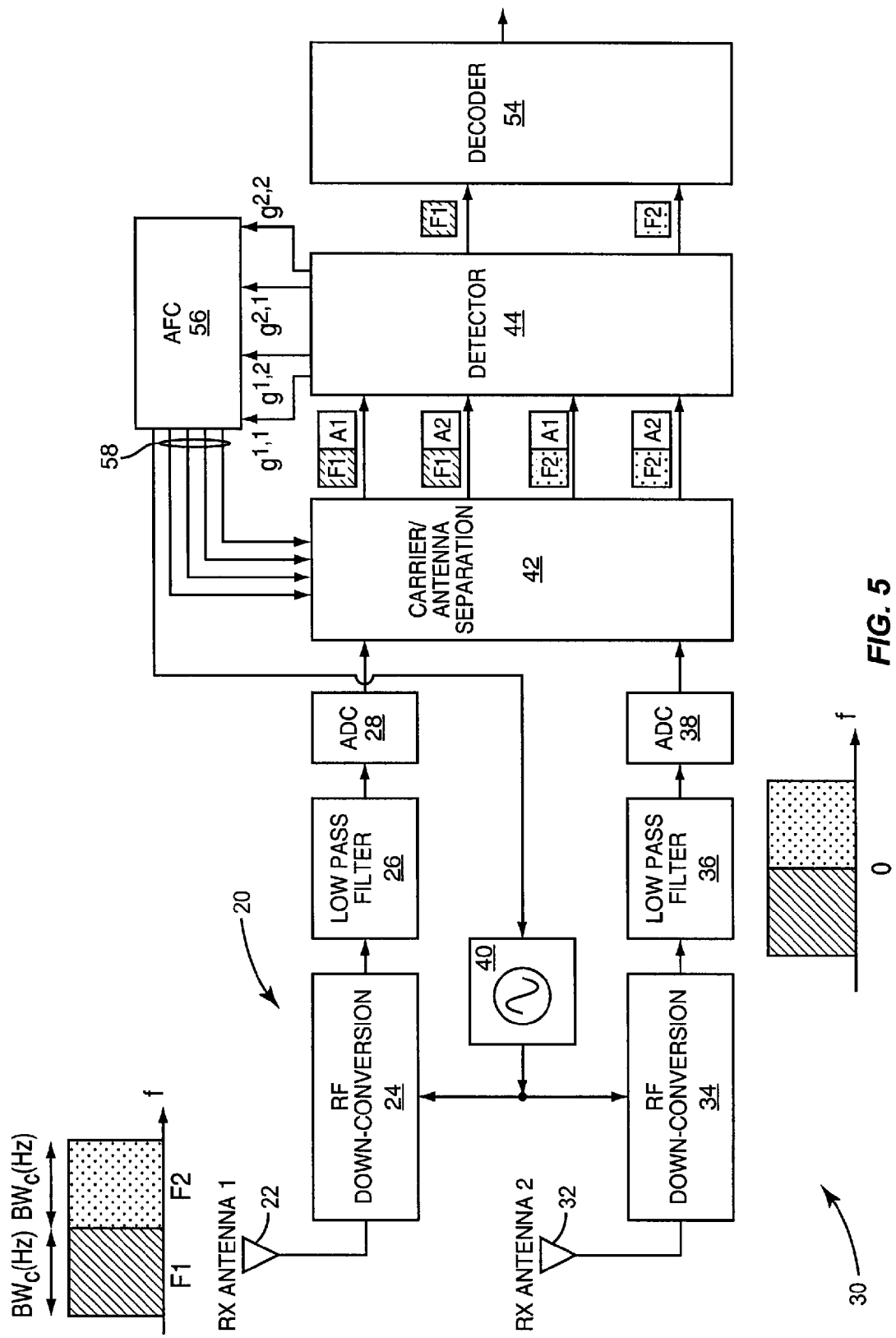
FIG. 5 is a functional block diagram of a dual-carrier receiver, according to another embodiment of the present invention.

FIG. 5 depicts another embodiment of the present invention, wherein the digital oscillator frequency error correction signals 58 are received by the Carrier/Antenna Separation function 42, where each is applied to a carrier/antenna separation digital oscillator 46, 48, 50, 52 (see FIG. 3). In this embodiment, the analog frequency correction of the local oscillator 40 can be adjusted to compensate for the frequency of either one of the carriers, or to any weighted average of the frequency error in each individual carrier. The carrier/antenna separation oscillators 60-66 can compensate for the residual frequency error on each carrier/antenna separated signal, due to a non-zero relative frequency error between the carriers.

The analysis and generation of frequency error correction signals for the embodiment depicted in FIG. 5 is the same as the algorithm described above with respect to the frequency adjustment digital oscillators 60-66, with the exception that step 9a is replaced with step 9b as follows:

9b. Let the $LO_{cntrl}$ signal control the frequency of the local oscillator 40. Apply $DO_{cntrl,1}$ and $DO_{cntrl,2}$ to the Carrier/Antenna separation function 42, where they are used to fine-tune the frequencies of carrier/antenna separation digital oscillators 46, 48, 50, 52 as depicted in FIG. 3. The fine-tuning of the frequencies of carrier/antenna separation oscillators is done as follows:

$$f_{46} = f_{50} = \frac{f_1 - f_2}{2} + DO_{cntrl,1}$$

$$f_{48} = f_{52} = -\left(\frac{f_1 - f_2}{2}\right) + DO_{cntrl,2}$$

Figure 6:
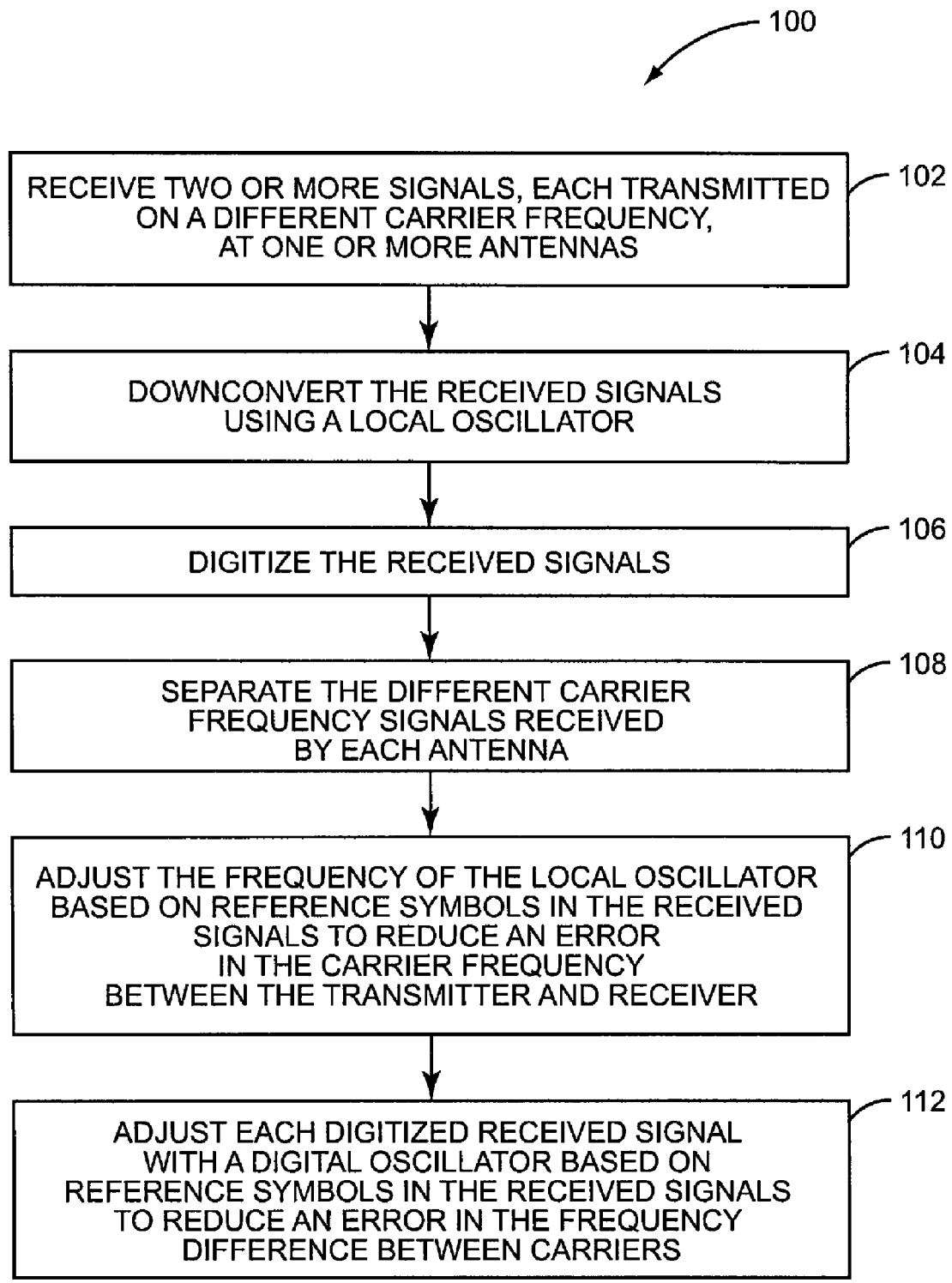
FIG. 6 is a flow diagram of a method of receiving multi-carrier signals.

FIG. 6 depicts a method 100 of frequency error correction in a multi-carrier receiver. The method 100 begins by receiving multi-carrier signals at one or more receiver antennas (block 102). The received signals are down-converted, using a common local oscillator (block 104), and digitized (block 106). The different carrier frequency signals received at each antenna are then separated in the digital domain (block 108), such as by mixing the multi-carrier signal to down-convert a desired carrier frequency, and low-pass filtering the result to remove unwanted carriers. The frequency of the local oscillator is adjusted to compensate for a possible frequency error between the transmitter and receiver, based on reference symbols in the received signals (block 110). The frequency of each digitized, separated signal is adjusted to reduce the relative frequency error between the carriers, based on reference symbols in the received signals (block 112). This may be done by frequency-adjusting the output of the carrier/antenna separation digital oscillators, or by controlling the outputs of frequency adjusting digital oscillators and mixing the separated signals with them. The method is continuous, with the frequency adjustment outputs updated with regular intervals, e.g. every slot based on newly received reference symbols.

Embodiments of the present invention allow efficient implementations of multi-carrier receivers, which can process multi-carrier signals that have a relative frequency error between the carriers. Embodiments of the present invention thus also enable efficient implementations of multi-carrier transmitters, by allowing them to operate with a finite but non-zero relative frequency error between the carriers. The wireless receiver according to embodiments of the invention may be implemented in a user equipment, or a consumer handset or personal digital assistant (PDA), wireless data card for use with a personal computer, etc. or in a base station.

Those of skill in the art will readily note that, although the embodiments described herein consider the case of two carriers, two transmit antennas, and two receive antennas, the same architecture can be extended to cover any combination of carrier and antenna configurations. Likewise, the embodiments described herein consider a receiver with direct down-conversion from radio frequency to baseband, though the embodiments of the invention also apply to other receiver architectures, such as a low-intermediate frequency (low-IF) receiver. Furthermore, although the embodiments described herein consider using known reference symbols for the estimation of frequency errors, the embodiments of the invention also apply when using other frequency estimation methods, e.g. blind frequency estimation.

Those skilled in the art will appreciate that several of the various functional elements described herein, may be implemented with processing circuits comprising hardware, software, or any combination thereof. In some embodiments, these processing circuits may include at least one special- or general-purpose microprocessor circuit (to include DSP-type processors) configured with appropriate software and/or firmware to carry out one or more of the methods and techniques described herein The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving signals in a wireless receiver, comprising:
   receiving, at one or more antennas, signals modulated onto one or more carrier frequencies;
   down-converting the one or more received signals by mixing each with the output of a common analog oscillator;
   digitizing the down-converted received signals;
   separating each of the received different carrier frequency signals;
   performing a coarse frequency adjustment by adjusting the output of the analog oscillator to reduce a frequency error between transmitted and received frequencies; and
   performing fine frequency adjustments on each of the frequency separated signals to compensate for an error in the difference between the carrier frequencies.

2. The method of claim 1, wherein separating each of the received different carrier frequency signals comprises mixing each digitized signal with the output of a carrier/antenna separation digital oscillator to down-convert a desired carrier and low-pass filtering the result to remove signal components outside the desired frequency range.

3. The method of claim 2, wherein performing fine frequency adjustments comprises adjusting the outputs of the carrier/antenna separation digital oscillators.

4. The method of claim 2, further comprising mixing each of a plurality of additional frequency adjustment digital oscillators with a carrier/antenna separated signal, and wherein performing fine frequency adjustments comprises adjusting the outputs of the frequency adjustment digital oscillators.

5. The method of claim 1, wherein the coarse and fine frequency adjustments are based on reference symbols in the received signals.

6. The method of claim 1, wherein the coarse frequency adjustment reduces the frequency error between the transmitted and received frequencies by applying a frequency control algorithm and the fine frequency adjustments compensate for a residual frequency error on each carrier/antenna separated signal, due to a non-zero relative frequency error between the carrier frequencies by applying a frequency control algorithm.

7. A receiver operative to receive and process wireless communication signals modulated onto one or more carrier frequencies, comprising:
   an analog oscillator;
   one or more front end circuits, each operative to down-convert a received signal by mixing with the output of the analog oscillator;
   one or more analog to digital converters, each operative to digitize a received, down-converted signal;
   a carrier/antenna separation function operative to separate each different frequency carrier signal; and
   an automatic frequency control function operative to perform a coarse frequency adjustment by adjusting the output of the analog oscillator to reduce a frequency error between transmitted and received frequencies and to perform fine frequency adjustments on each of the frequency separated signals to compensate for an error in the frequency difference between the carrier frequencies.

8. The receiver of claim 7, wherein the carrier/antenna separation function comprises one or more carrier/antenna separation digital oscillators and low-pass filters, and wherein the carrier/antenna separation function is being operative to separate each different frequency carrier signal by mixing each digitized signal with the output of a carrier/antenna separation digital oscillator to recover a desired carrier frequency and low-pass filtering the mixer output to remove signal components outside the desired frequency range.

9. The receiver of claim 8, wherein the automatic frequency control function is operative to adjust the outputs of the carrier/antenna separation digital oscillators to perform fine frequency adjustments on each of the frequency separated signals.

10. The receiver of claim 8, the receiver further comprising one or more additional frequency adjustment digital oscillators, operative to perform fine frequency adjustments on each of the frequency separated signals by adjusting the output of each additional frequency adjustment digital oscillator.

11. The receiver of claim 7, wherein the automatic frequency control function is operative to perform the coarse and fine frequency adjustments based on reference symbols in the received signals.

12. User Equipment (UE) operative in a wireless communication system transmitting signals on one or more carrier frequencies, comprising:
   one or more antennas operative to receive the signals;
   a local oscillator operative to down-convert the received signals;
   analog to digital converters operative to digitize the received signals;
   a carrier/antenna separation function operative to separate each different frequency carrier signal; and
   an automatic frequency control function operative to perform a coarse frequency adjustment by adjusting the output of the analog oscillator and to perform fine frequency adjustments on each of the frequency separated signals to compensate for an error in the frequency difference between the carrier frequencies.

13. A base station in a wireless communication system in which communication signals are modulated onto one or more carrier frequencies, comprising:
   one or more antennas operative to receive the signals;
   a local oscillator operative to down-convert the received signals;
   analog to digital converters operative to digitize the received signals;
   a carrier/antenna separation function operative to separate each different frequency carrier signal; and
   an automatic frequency control function operative to perform a coarse frequency adjustment by adjusting the output of the analog oscillator and to perform fine frequency adjustments on each of the frequency separated signals to compensate for an error in the frequency difference between the carrier frequencies.

* * * * *